United States Patent [19]

Gaffney et al.

[11] Patent Number: 4,998,321
[45] Date of Patent: Mar. 12, 1991

[54] HANDLE ASSEMBLY

[75] Inventors: Thomas E. Gaffney; Clarence E. Klessig, both of Sheboygan; Alan J. Weir, New Holstein; Stanley M. Grycan, Sheboyan Falls, all of Wis.

[73] Assignee: Kohler Co., Kohler, Wis.

[21] Appl. No.: 466,164

[22] Filed: Jan. 17, 1990

[51] Int. Cl.⁵ .............................................. A47B 95/02
[52] U.S. Cl. .................................... 16/110 R; 16/117; 16/DIG. 18; 74/557; 74/528
[58] Field of Search ......... 16/110 R, 114 R, DIG. 18, 16/117; 74/557, 528, 548

[56] References Cited

U.S. PATENT DOCUMENTS

| | | |
|---|---|---|
| 1,518,224 | 9/1924 | Seidemann et al. |
| 1,685,643 | 9/1928 | Micali . |
| 1,878,569 | 3/1932 | Zolleis ............................... 16/117 |
| 2,023,951 | 12/1935 | Cohan ................................ 287/53 |
| 2,542,941 | 2/1951 | Post .................................. 248/251 |
| 2,574,648 | 11/1951 | Mason ............................... 287/91 |
| 2,596,795 | 5/1952 | Schulze .............................. 287/53 |
| 2,607,616 | 8/1952 | Davidson ........................... 287/53 |
| 2,685,466 | 8/1954 | Middleton .......................... 287/53 |
| 2,838,270 | 6/1958 | Danielson .......................... 74/548 |
| 3,864,051 | 2/1975 | Reid .................................. 403/408 |
| 4,349,940 | 9/1982 | Fleischmann et al. ............ 16/110 R |
| 4,829,632 | 5/1989 | Freier et al. ...................... 16/114 R |

OTHER PUBLICATIONS

Undated, admitted prior art, drawings/ads–The Kohler "Cygnet" handle.
Undated, admitted prior art, drawings/ads–The Kallista "Minos" handle.

Primary Examiner—Richard K. Seidel
Assistant Examiner—Patty E. Hong
Attorney, Agent, or Firm—Quarles & Brady

[57] ABSTRACT

A handle assembly includes an open-ended sleeve connectable to a valve stem by a screw inserted and removed through the open end. A removable cap has four cross openings which align with four cross openings in the sleeve. Two cross members are placed in the cross openings and interfitted inside the sleeve. In one embodiment, the internal connection is provided in part by a hole in one of the cross members. In a preferred embodiment, the cross members have contacting surfaces for engaging the sleeve and the cap. The handle assembly is adjustable for use with a variety of sleeves.

7 Claims, 3 Drawing Sheets

HANDLE ASSEMBLY

BACKGROUND OF THE INVENTION

A. Field of the Invention

This invention relates to decorative handle assemblies such as those used to control rotatable valve stems. The invention is also useful for securing a handle like element in other instances (e.g. in conjunction with a door).

B. Description Of The Art

Faucet handle assemblies have been developed which address many of the problems in the field (e.g. vandal resistance, no exposed screws or snap caps, ease of manufacture and assembly) See U.S. Pat. Nos. 4,349,940 and 4,829,632. However, these valves were bar-type handles. For some decorative applications, a four-pronge assembly is desired.

Summary Of The Invention

The invention provides a handle assembly or the like connectable to a support. In a preferred embodiment, an open-ended sleeve is connectable to the support by a fastener inserted and removed through the open end. The sleeve has at least four cross openings near the open end. A cap portion covers the open end and has at least four cross openings aligned with the cross openings of the sleeve. A first cross arm member is engageable in two of the cross openings of the sleeve and two cross openings of the cap portion. A second cross arm member is engageable in the other two cross openings of the sleeve and the other two cross openings of the cap portion. There are means for interfitting the first cross member with the second cross member inside the sleeve.

In one embodiment, the means for interfitting the cross member includes a through hole in a portion of one cross member which is of a size that a portion of the second cross member can fit through.

In another embodiment, each cross member projects laterally from the sleeve in at least two different directions. There is at least one enlarged end nut attached at an outer end of each cross member and there is at least one spacer positioned on each cross arm between the end nut and the sleeve to limit movement of the end nut towards the sleeve.

In still another embodiment, one of the cross members includes a first contacting surface for engaging the sleeve and a second contacting surface for engaging the cap portion.

In yet another embodiment, the sleeve cross opening is non-circular and a portion of one of the cross members engageable with this non-circular cross opening is also non-circular so as to limit rotation of that cross member about its own longitudinal axis. The through hole can therefore readily be aligned with respect to two sleeve cross openings.

In still another embodiment, the stem is a rotatable valve stem and splines are formed on the sleeve to drive the stem upon rotation of the handle assembly.

The objects of the invention therefore include:

a. a providing a handle assembly of the above kind in which the handle may be operatively connected to the stem by a hidden connecting means;

b. providing an assembly of the above kind in which several components of the cross members can be identical to each other so as to reduce the cost of manufacturing;

c. providing an assembly of the above kind which affords a multiplicity of cross members;

d. providing an assembly of the above kind which is adaptable for use with a variety of escutcheons;

e. providing an assembly of the above kind which affords a stable unit; and f. providing an assembly of the above kind which is easily assembled.

These and still other objects and advantages of the invention will be apparent from the description which follows. In the detailed description below, the preferred embodiments of the invention will be described in reference to the accompanying drawings. These embodiments do not represent the full scope of the invention. Rather the invention may be employed in other embodiments. Reference should therefore be made to the claims herein for interpreting the breadth of the invention.

Description Of The Preferred Embodiments

Figure 1:
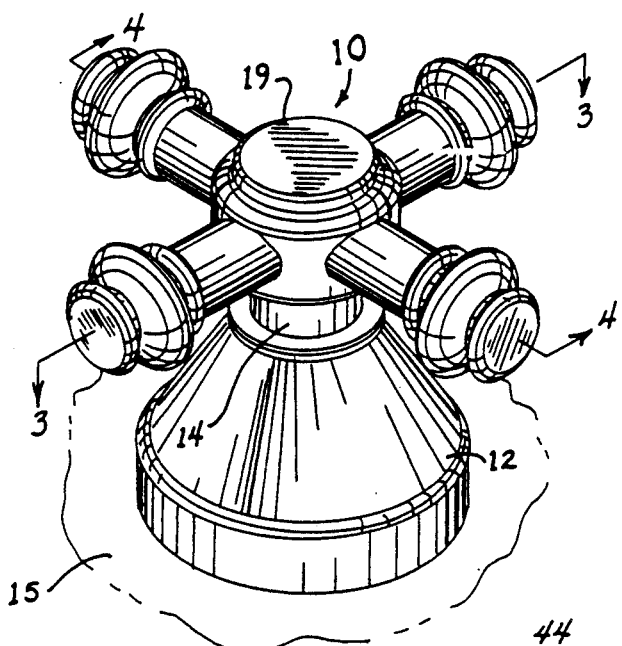
FIG. 1 is a top perspective view showing a preferred handle assembly of the invention, the assembly being shown mounted on a portion of a lavatory top.
Figure 4:
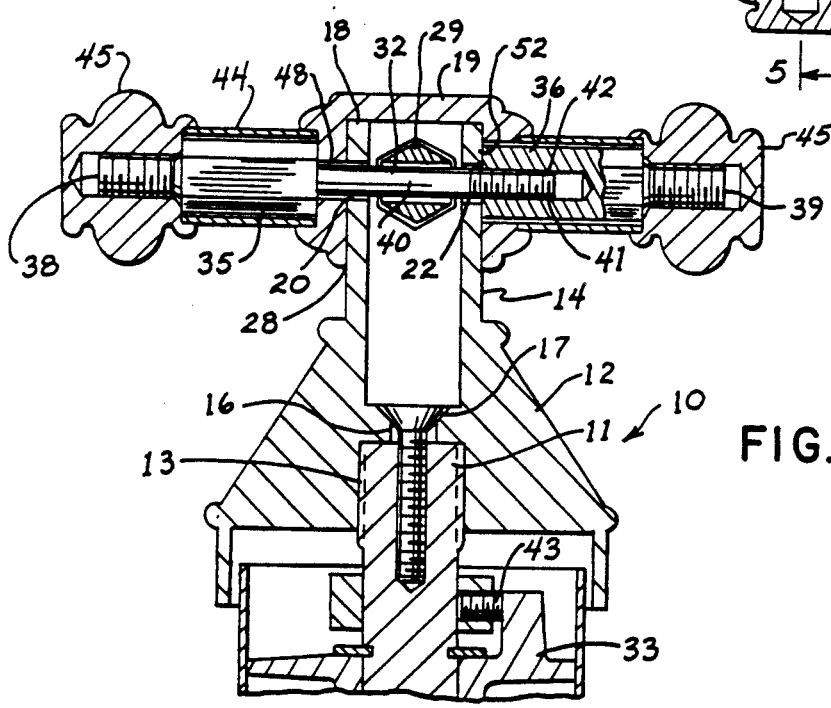
FIG. 4 is a vertical sectional view taken on line 4—4 of FIG. 3.

Referring to FIGS. 1 and 4, a preferred handle assembly generally 10 is shown in conjunction with a splined valve stem 11. The dotted lines near the top of the stem indicate the splines. It includes an escutcheon 12 having an annular lower compartment 13 for receiving the splined valve stem 11. An open ended sleeve 14 extends from the escutcheon 12 and receives a screw 17 through a through bore 16 for mounting the handle assembly 10 to the valve stem 11 above the lavatory top 15. The valve stem is connected to the valve assembly 33 by suitable means (e.g. 43).

Figure 3:
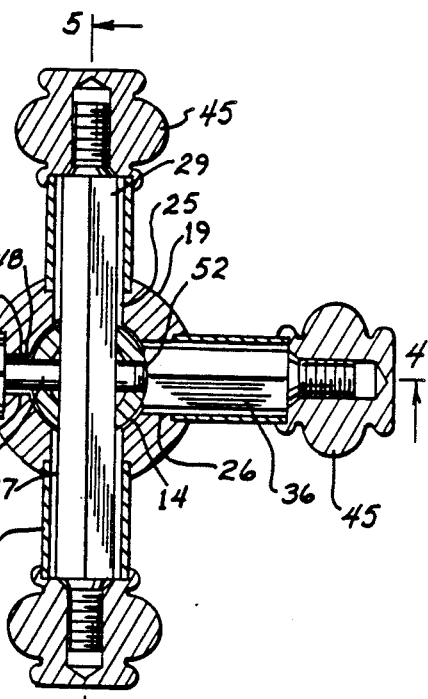
FIG. 3 is a horizontal section at view taken on line 3—3 of FIG. 1.
Figure 2:
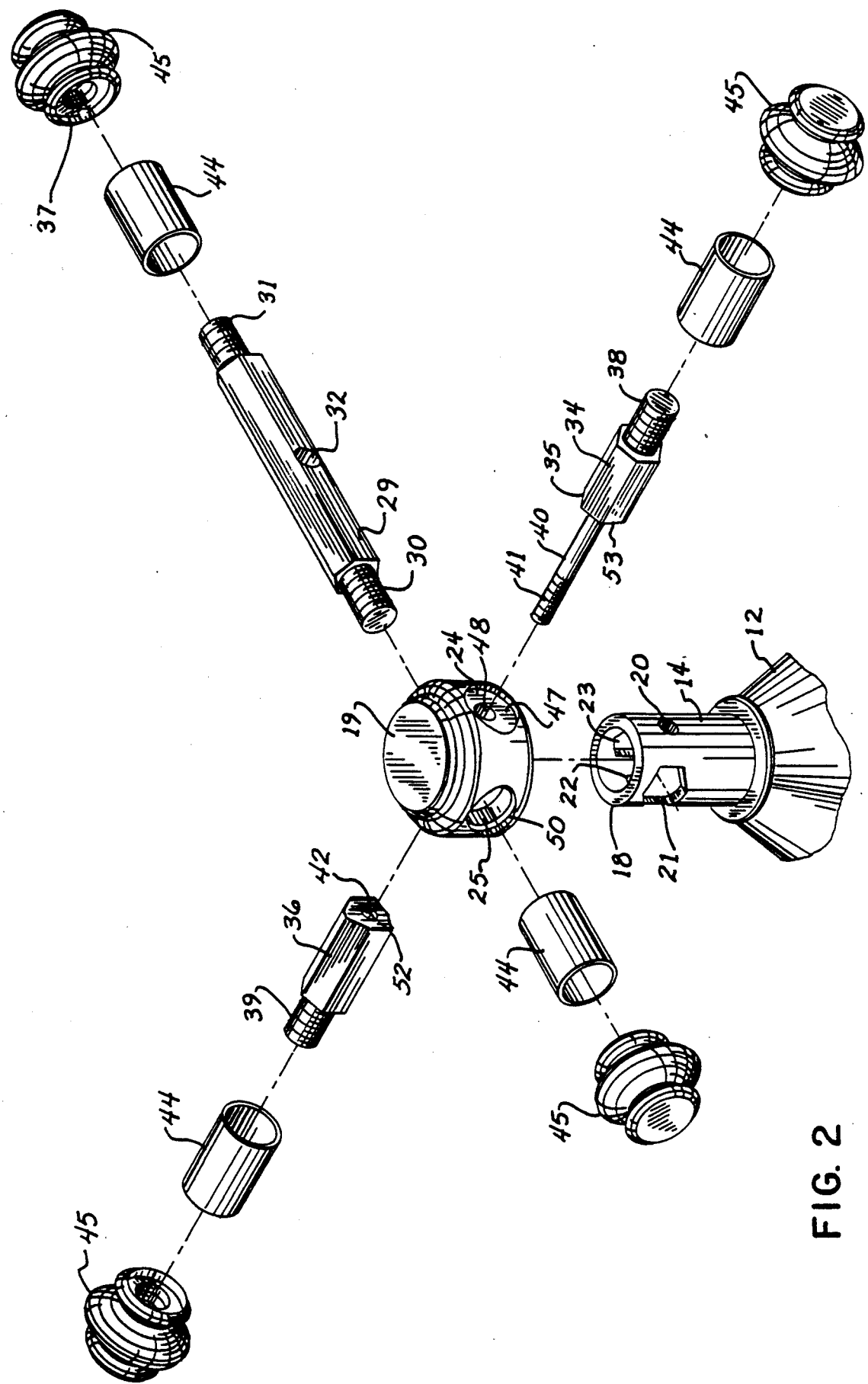
FIG. 2 is an exploded perspective view of the upper parts of the FIG. 1 handle assembly.

As best seen in FIG. 2, the sleeve 14 has an end surface 18 for placement in the bottom of the cap 19. This is afforded by the opening 28 as shown in FIG. 4. The sleeve 14 has four cross openings 20, 21, 22 and 23. It will be noted that cross openings 20 and 22 are circular, whereas cross openings 21 and 23 are larger and non-circular (hexagonal). It will also be seen that there are four cross openings 24, 25, 26 and 27 in the cap 19 for alignment with the cross openings 20-23 in the sleeve 14. Cross openings 26 and 27 are best shown in FIG. 3.

Figure 5:
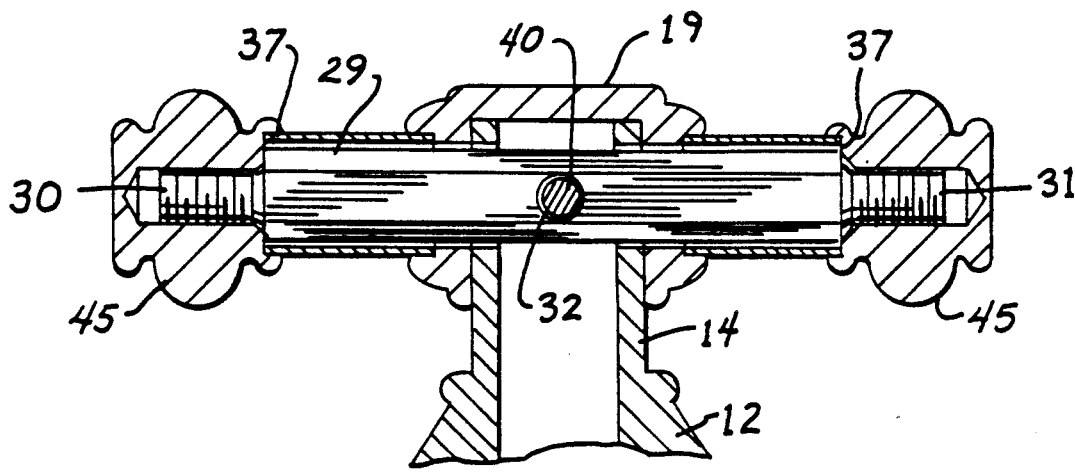
FIG. 5 is a partial view in vertical section taken on line 5—5 of FIG. 3.

A first cross member 29 is engageable in the cross openings 25 and 27 of the cap 19 as well as the cross openings 21 and 23 in the sleeve 14 when the cap 19 is placed on the sleeve 14. A second cross member is composed of a first unit 35 engageable in the cross openings 24 and 26 of the cap 19 as well as the cross openings 20 and 22 of the sleeve 14. The cross member unit 35 has a stud portion 40 with threads 41 for engagement in the internal threads 42 of a second unit 36 to provide a two piece second cross member 34. An interfitting of the cross members 29 and 34 is afforded inside the cap 19 and sleeve 14 by a hole 32 placed through the first cross member 29. This is illustrated in FIG. 5 with the stud 40 extending through the hole 32.

Referring again to FIG. 2, it is seen that the cap 19 has an inner wall 47 disposed inwardly of the opening 24. The purpose of this wall 47 is for contact against the contacting surface 53 of the cross member unit 35. In contrast, the second part of the cross member 36 has an arcuate contacting surface 52 for direct contact against the sleeve 14. This is best seen in FIG. 4. It should be appreciated that this particular contact by the cross member units 35 and 36 with the cap and the sleeve affords a very sturdy connection.

The inner wall 47 not only provides a contacting surface with the first unit 35, but also affords an engagement surface for a spacer such as 44 when placed over unit 35. The other openings such as 25, 26 and 27 have an inner annulus such as shown at 50 for restraining inner movement of the other spacers 44 when similarly positioned.

With the cross members innerconnected as shown in FIG. 3, the spacers 44 are placed over the extending portions of the cross member 29 and cross member units 35 and 36.which radiate from the cap 19. They are held on the cross members by the nuts 45 which engage the threads 30 and 31 on the cross member 29 and the threads 38 and 39 on the cross member 34. In this manner the spacers 44 limit movement of the nuts 45 toward the spacers 44. Note also the undercuts 37 in the nuts 45 to accommodate the spacers 44.

Sleeve cross openings 21 and 23, as well as cross member 29, are formed in a non-circular manner. This facilitates the alignment of the hole 32 with the cross openings 20 and 22 in the sleeve 14, as well as with the hole 48 and the opening 26 in the cap portion 19. This non-circular configuration also allows the nut 45 to be threaded onto the threads 30 without rotating the cross member 29.

It will be seen that the first and second units 35 and 36 of the second cross member 34 also have a non-circular configuration. This assists in facilitating the tightening of the two members when the threads 41 engage the threads 42. Also facilitating the threaded engagement of the threaded cross member units 35 and 36 is the fact that the threads 38 and 39 as well as the threads 41 and 42 are right handed so that clockwise turning of the nuts 45 with engaging threads 38 and 39 will effect a tightening of the threads 41 and threads 42.

Figure 6:
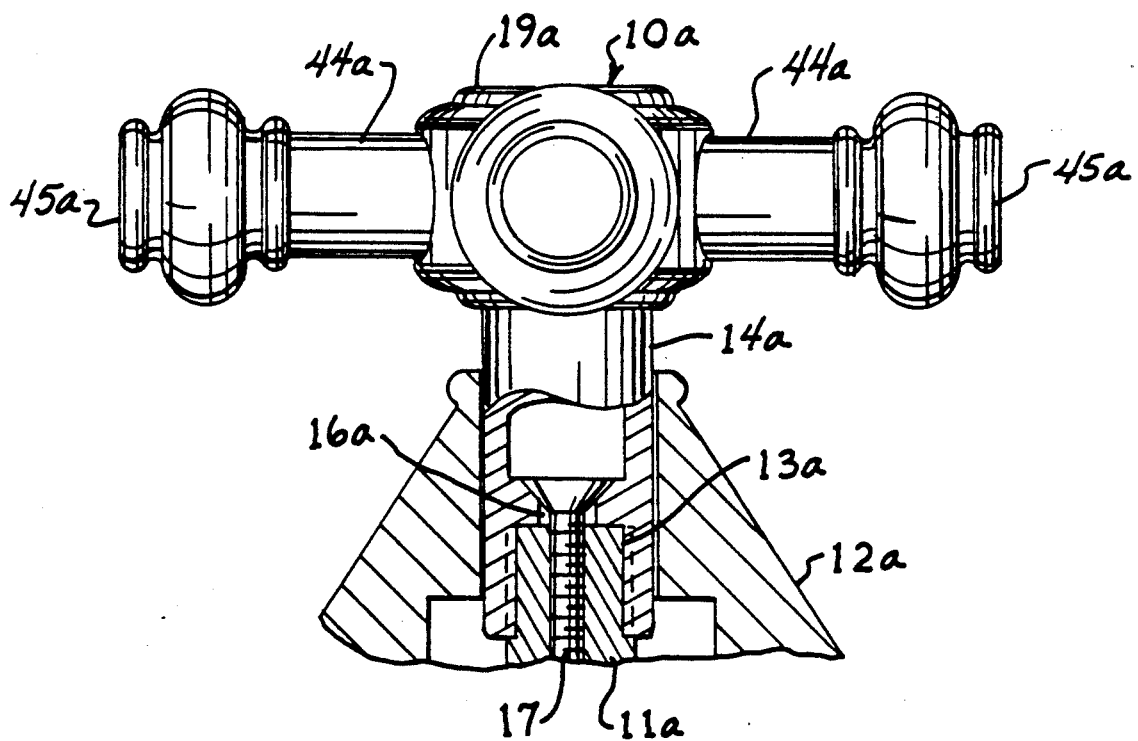
FIG. 6 is a partial front elevational view of an alternative embodiment, a portion shown in cross section.

FIG. 6 illustrates an alternative embodiment (generally 10a.) The same or similar parts are referred to by the same reference number, except followed by the letter "a". Unlike embodiment 10, the sleeve 14a is formed separately from the escutcheon 12a. In all other respects, the handle assembly is the same with respect to the cap 19a, the spacers 44a and the nuts 45a. The handle assembly 10a will include the previously described cross members 29 and 34. Although not shown in the drawing, it is within the scope of this invention to also provide an independent connection between the escutcheon 12a and the valve assembly 33 by means of a threaded collar which would be internally and externally threaded.

Thus, the invention provides an improved faucet assembly or the like. While the preferred embodiments have been described above, it is apparent to those skilled in the art that a number of modifications and changes may be made without departing from the spirit and scope of the invention. For example, while the handle assembly has been shown in conjunction with a valve stem 11, it is conceivable that this handle assembly could be utilized as well for a door handle. Further, it is not essential that the non-circular configurations be used on the cross members 29 for the cross openings 21 and 23. If the cross members are first assembled so that the stud 40 is placed in the hole 32, this would prevent rotation of the cross member 29 upon further assembly.

The nuts 45 are shown of a certain configuration. These can be different geometric configurations. Neither is it necessary that they all be identical. The same is true with respect to spacers 44.

Further, the spacers 44 would not have to be formed as separate pieces, but could be attached to the nuts 45. While the preferred embodiment utilizes a symmetrical configuration for the cross members as they extend from the cap 19, it is also within the scope of this invention to utilize a non-symmetrical configuration. For example, the unit 36 of the cross member 34 could be formed as an elongated portion of the nut 45 and would not have to extend the same distance radially as the other cross members from the cap 19. In addition, one of the spacers 44 could be of a longer length and the contacting annulus 50 eliminated so that it would engage the sleeve 14. This could provide added stability. All such (and certain other modifications) are meant to be within the scope of the invention.

We claim:

1. A handle assembly connectable to a stem, comprising:
    an open-ended sleeve which is connectable to the stem by a fastener inserted and removed through the open end, the sleeve having at least four cross openings near the open end;
    a cap portion that covers the open end and has at least four cross openings aligned with the cross openings of the sleeve;
    a first cross member engageable in two of the cross openings of the sleeve and two of the cross openings of the cap portions;
    a second cross member.engageable in the other two cross openings of the sleeve and the other two cross openings of the cap portion; and
    means for interfitting the first cross member with the second cross member inside sleeve such that one cross member crosses past the other cross member inside the sleeve.

2. A handle assembly, comprising:
    an open-ended sleeve which is connectable to the stem by a fastener inserted and removed through the open end, the sleeve having at least four cross openings near the open end;
    a cap portion that covers the open end and has at least four cross openings aligned with the cross openings of the sleeve;
    a first cross member engageable in two of the cross openings of the sleeve and two of the cross-openings of the cap portion;
    a second cross member engageable in the other two cross openings of the sleeve and the other two cross openings of the cap portion; and
    means for interfitting the first cross member with the second cross member inside the sleeve;
    wherein the means for interfitting comprises a through hole in a portion of one cross member which is of a size that a portion of the second cross member can fit through the hole.

3. A handle assembly as defined in claim 2, wherein:
each cross member projects laterally from the sleeve in at least two different directions;
there is at least one enlarged end nut attached at an outer end of a cross member; and
there is at least one spacer positioned on a cross member between the end nut on that cross member and the sleeve to limit movement of the end nut towards the sleeve.

4. A handle assembly as defined in claim 2, wherein one of the cross members includes a first contacting surface for engaging the sleeve and a second contacting surface for engaging the cap portion.

5. A handle assembly as defined in claim 2, wherein a depending skirt is formed integrally with the sleeve.

6. A handle assembly as defined in claim 2, wherein a sleeve cross opening is non-circular, a portion of one of the cross members engageable with this non-circular cross opening is also non-circular, whereby the rotation of that cross member about its own longitudinal axis in the cross opening is limited and the through hole can readily be aligned with respect to two sleeve cross openings.

7. The handle assembly of claim 1, wherein the stem is a rotatable valve stem, and splines are formed on the sleeve to drive the stem upon rotation of the sleeve.

* * * * *